PENTODE OSCILLATOR DEFLECTION CIRCUIT WITH FEED BACK
Filed June 1, 1962
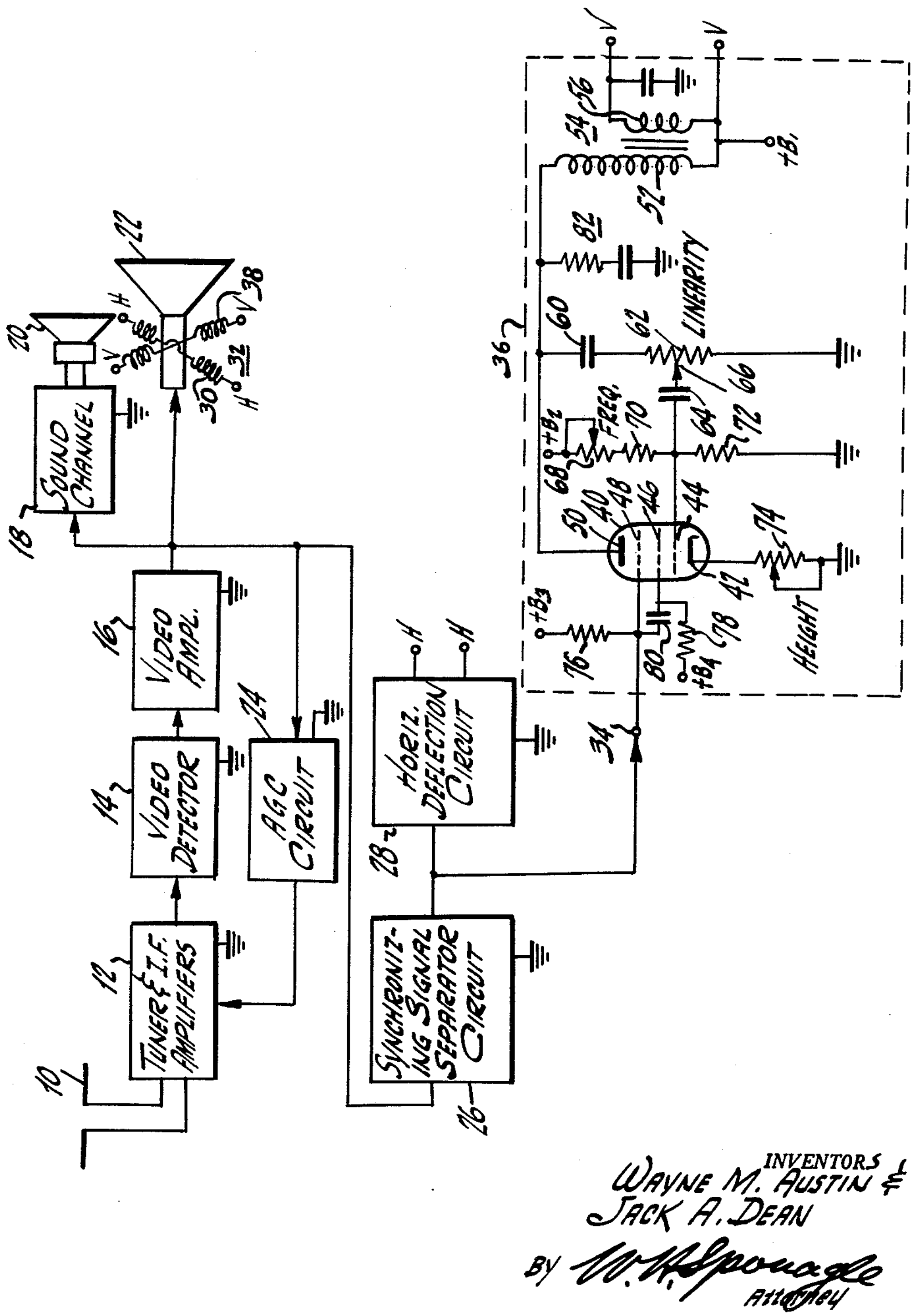
INVENTORS
WAYNE M. AUSTIN &
JACK A. DEAN
BY W. H. Sprague
Attorney 3,187,219
Patented June 1, 1965

1

3,187,219
PENTODE OSCILLATOR DEFLECTION CIRCUIT WITH FEED BACK

Wayne M. Austin, Hanover, and Jack Allen Dean, East Brunswick, N.J., assignors to Radio Corporation of America, a corporation of Delaware Filed June 1, 1962, Ser. No. 199,495
13 Claims. (Cl. 315—27)

This invention relates to television receiver circuits, and more particularly to deflection circuits for generating deflection signals to apply to an electromagnetic deflecting device of the cathode ray image reproducing tube of a television receiver.

In order to reproduce an image on the light producing screen or face of the cathode ray image reproducing tube in a television receiver, the electron beam of the tube is caused to scan a raster on the screen of the tube so that light is emitted from the screen in a series of vertically-spaced, horizontal lines. In the scanning process the electron beam is deflected both vertically and horizontally from its normal position. As is known, present day cathode ray tubes in commercial television receivers generally are designed and built to use electromagnetic deflection provided by a deflection yoke, which includes both horizontal and vertical deflection coil windings through which the proper currents are driven to provide the desired time-varying magnetic field for vertical and horizontal deflection.

In order to drive the deflection windings of a deflection yoke, most commercial television receivers utilize a deflection circuit including a waveform generating circuit, including an electron tube, followed by a power amplifier tube which provides sufficient current to properly deflect the electron beam. The circuit is synchronized in response to synchronizing signals contained in the composite television video signals processed in the receiver.

In the interest of economy, it is desirable to reduce the number of electron tubes and other components required to produce the deflection signals, while at the same time maintaining manual adjustments of the linearity, frequency, and amplitude of the signals generated by the circuit.

This invention relates to a vertical deflection circuit for generating deflection current for the deflection windings of an electromagnetic deflection yoke in a television receiver and includes a single pentode electron discharge device that performs the functions of generating properly shaped deflection signals together with sufficient output current to drive the deflection windings of the yoke. The deflection windings of the yoke are transformer coupled to the anode of the pentode, and feedback is provided for the device to maintain self-oscillations in the circuit. The self-oscillations of the circuit are synchronized with the received synchronizing signal by applying to the electron device a control signal responsive to the synchronizing signal.

The invention may be better understood when the following detailed description is read in connection with the sole figure of the drawing, which is a schematic circuit diagram, partly in block form, of a television receiver having a vertical deflection circuit embodying the invention.

The television receiver illustrated in the sole figure includes an antenna 10 for intercepting and supplying a radio frequency television wave to the tuner and IF amplifier circuits 12 of the receiver. The radio frequency television wave includes a picture carrier wave, amplitude modulated with composite video signals containing image signals and horizontal and vertical synchronizing signals; and a sound carrier wave, spaced 4.5 megacycles in frequency from the picture carrier wave according to present day standards, frequency modulated with sound signals. An intermediate frequency (IF) version of the radio frequency television wave is available at the output of the tuner and IF amplifiers 12 and is applied to a video detector 14, where the amplitude modulation of the IF picture wave is detected to derive the composite video signals, and the picture and sound IF carrier waves are heterodyned to provide a 4.5 megacycle intercarrier sound wave, frequency modulated with the sound signals. The composite video sginals and the intercarrier sound wave are amplified through a video amplifier 16, and the intercarrier sound wave is extracted and applied to a sound channel 18 where it is further amplified and demodulated to derive sound signals that are applied to a loudspeaker 20 for sound reproduction.

The video signals from the video amplifier 16 are applied, as is known, to a cathode ray tube 22 to modulate the intensity of the electron beam of the tube with the image portions of the video signals. The video signals are also applied to an AGC circuit 24 which derives an automatic gain control (AGC) voltage responsive to the amplitude of the video signals. The AGC voltage is applied to the tuner and IF amplifiers 12 to control the gain of certain amplifiers therein and maintain the amplitude of the detected video signals substantially constant despite wide variations in the amplitude of the radio frequency television wave intercepted by the antenna 10.

Finally, as is known, the composite video signals are supplied to a synchronizing signal separator circuit 26 which strips the horizontal and vertical synchronizing pulses from the composite video signals and supplies the horizontal synchronizing pulses to a horizontal deflection circuit 28. The horizontal deflection circuit 28 generates the proper deflection signals to supply to the horizontal deflection windings 30 of an electromagnetic deflection yoke 32 positioned around the neck of the cathode ray tube 22. The horizontal deflection signals are applied from the terminals H—H of the horizontal deflection circuits 28 to the terminals H—H of the horizontal deflection windings 30.

The vertical synchronizing pulses from the synchronizing signal separator 26 are applied to an input terminal 34 of a vertical deflection circuit 36 embodying the invention, in a manner to be explained hereinafter. Vertical deflection signals are available from the vertical deflection circuit 36 at its output terminals V—V and are applied directly to the terminals V—V of vertical deflection windings 38 of the electromagnetic deflection yoke 32.

The circuitry included in the vertical deflection circuit 36 includes a pentode electron tube 40, having a cathode 42, a control grid 44, a screen 46, a suppressor 48, and an anode 50. The anode 50 is connected to an anode voltage supply, $+B_1$, through the primary winding 52 of an output transformer 54, the secondary winding 56 of which is directly connected to the output terminals V—V. One end of the secondary winding 56 is also connected directly to the anode voltage supply, $+B_1$.

In order to provide self-oscillations in the circuit, a feedback path is provided between the anode 50 and the control grid 44 of the tube 40 and includes a coupling capacitor 60 connected between the anode 50 and one end of a linearity control potentiometer 62, with the other end of the potentiometer 62 connected directly to ground, or a point of reference potential, for the circuit. A charging capacitor 64 is directly connected between a variable tap 66 on the potentiometer 62 and the control grid 44 of the tube 40. A charging voltage is provided for the charging capacitor 64 by a charging voltage supply, $+B_2$, applied to the control grid 44 through a voltage divider, which includes a frequency control potentiometer 68, a first resistor 70, and a second resistor 72 connected in the order named between the charging voltage supply, $+B_2$, and ground for the receiver. The control grid 44 and one terminal of the charging capacitor 64 are connected directly to the junction of the first and second resistors 70 and 72.

A height control potentiometer 74 is connected directly between the cathode 42 and ground for the receiver. Operating voltage is supplied to the suppressor 48 from a suppressor voltage supply, $+B_3$, through a suppressor resistor 76, and the screen 46 is supplied with operating voltage from a screen voltage supply, $+B_4$, through a screen resistor 78. Coupling is provided between the screen 46 and suppressor 48 by a coupling capacitor 80. A resistor-capacitor damping circuit 82 is connected between the anode 50 and ground to prevent spurious oscillations in the circuit.

The circuit operates in the following manner: Assume that initially a charge exists on the charging capacitor 64 which is sufficiently negative to cut off space current flow in the tube 40. Under these conditions the screen 46 is at the potential of the screen voltage supply, $+B_4$, and the anode 50 is at the potential of the anode voltage supply, $+B_1$. The capacitor 64 begins to discharge through the resistance in the circuit of the control grid 44, and current begins to flow both to the screen 46 and the anode 50. Sufficient current is conducted from the anode 50 through the primary winding 52 of the transformer 54 and thus to the vertical deflection windings 38 to drive the vertical deflection windings 38 of the yoke 32. This is the trace time during which light is emitted from the face of the cathode ray tube. As the screen 46 begins to draw current its voltage will decrease because of the voltage drop across the screen resistor 78. This decreasing voltage is coupled from the screen 46 to the suppressor 48 through the coupling capacitor 80, causing the suppressor 48 to return more electrons to the screen 46. This action results in an avalanche condition in which more current drawn by the screen 46 causes the suppressor 48 to return more current to the screen 46 further decreasing its voltage until a negative voltage is developed and supplied to the suppressor 48 to return all of the space current of the tube to the screen 46, and abruptly cut off the anode current.

The abrupt cut off of the anode current of the tube causes a large positive retrace voltage pulse to be developed across the inductive primary winding 52 of output transformer 54. This is the retrace time during which the electron beam of the tube is rapidly returned to its starting position. The positive retrace voltage pulse is coupled back to the control grid 44 through the coupling capacitor 60, the charging capacitor 64, and the linearity potentiometer 62, and causes heavy current flow to the control grid 44 of the tube 40, which charges the charging capacitor 64 negative at the terminal connected to the control grid 44 and cuts off all space current in the tube 40. At the cessation of the retrace pulse, the voltage on the anode 50 returns to the potential on the anode voltage supply, $+B_1$, since no current is flowing to the tube, and the screen 46 returns to the potential of the screen voltage supply, $+B_4$, for the same reason. The suppressor 48 again becomes positive and places the tube in condition for conduction. The charging capacitor 64 again begins to discharge, as previously explained, allowing anode current to flow to provide deflection current, and the cycle is repeated.

The amplitude, or height, of the deflection signal during trace time is manually adjusted by variation of the height control potentiometer 74 to adjust the negative cathode feedback in the circuit and thus adjust the gain of the amplifier tube 40. The frequency control potentiometer 68 serves as a manual adjustment of the frequency of oscillations by controlling the resistor-capacitor time constant of the circuit connected with the control grid 44 to control the discharge time of the charging capacitor 64. In addition, the frequency control potentiometer 68 aids in establishing a direct bias level on the control grid 44.

The circuitry in the feedback path for sustaining self-oscillations is also used as a linearity control for the circuit. By adjusting the movable tap 66 on the linearity control potentiometer 62 the amount of feedback voltage applied to the control grid 44 during trace time (when the charging capacitor 64 discharge is causing anode current flow) provides linearity control by negative feedback of the voltage waveform on the anode 50 to the control grid 44. This action is in addition to that of adjusting the amplitude of the retrace pulse fed back during retrace time. Adjustment of the linearity control potentiometer 62 has some effect on the frequency of oscillations of the circuit because it affects the time constant of the circuit of the control grid 44.

It will be appreciated that separate circuitry could be used for feedback of the retrace pulses and for feedback of the plate waveform during trace time. However, the circuit shown in the sole figure of the drawing has proved satisfactory, and interaction between the various manual controls has not been found to be objectionable. The circuit utilizes an output transformer 54 and vertical deflection coils 38 of well known types that are used in present day commercial television receivers.

In order to synchronize the oscillations of the vertical deflection circuit 36 with the vertical synchronizing pulses contained in the composite television video signals, the vertical synchronizing pulses are applied to the input terminal 34 as a negative pulse signal. A negative-going vertical synchronizing pulse applied from the input terminal 34 to the suppressor 48 of the tube 40 drives the suppressor 48 negative. The negative suppressor 48 immediately begins returning all of the space current in the tube to the screen 46, initiating the avalanche action previously explained, cutting off the anode current of the tube 40 and initiating the retrace pulse. The operation of the circuit then follows that previously explained with respect to the self-oscillating condition. Briefly, however, the retrace pulse applied to the control grid 44 causes heavy current flow therein charging the charging capacitor 64 to cut off all space current in the tube 40. The charging capacitor 64 begins to discharge, initiating anode current and beginning the trace period. The trace period continues until the next vertical synchronizing pulse is applied to the suppressor 48, cutting off anode current flow and reinitiating the cycle.

It will also be appreciated that the frequency of operation of the circuit may be controlled by a direct voltage signal applied to one of the electrodes to control the gain of the tube 40. Such a direct voltage control signal may be derived from various types of automatic frequency control circuits that are in wide use in the horizontal deflection circuits of commercial television receivers.

What is claimed is:

1. In a television receiver having a cathode ray image tube reproducing device and electromagnetic deflection windings for supplying current varying at a given periodicity to said device, a deflection waveform generator for said deflection tube windings, comprising in combination:

an electron tube having an anode, a cathode and a plurality of electrodes intermediate between said cathode and anode;

circuit means connected to a first of said electrodes for deriving a signal at said given periodicity in response to space current flow to a first of said electrodes;

means for applying said signal to a second of said electrodes to increase the space current flow to said first of said electrodes and decrease the space current flow to said anode at said given periodicity;

feedback means connected between said anode and a third of said electrodes to cause self-oscillations at said given periodicity in said circuit to sequentially initiate and cut off space current flow in said tube in response to the current flow from said anode; and coupling means connected between said deflection windings and the anode-to-cathode path of said tube for applying deflection current at said given periodicity to said windings.

2. In a television receiver having a cathode ray image tube reproducing device and electromagnetic deflection windings for said device, a deflection waveform generator for supplying current varying at a given periodicity to said deflection windings, comprising in combination:

an electron tube having an anode, a cathode and a plurality of electrodes intermediate between said cathode and anode;

power supply means connected to said tube to set up space current flow between at least the cathode and anode of said device;

circuit means connected to a first of said electrodes for deriving a signal at said given periodicity in response to space current flow to said first of said electrodes;

means for applying said signal to a second of said electrodes in a polarity to increase the space current flow to said first of said electrodes and decrease the space current flow to said anode at said given periodicity;

feedback means connected between said anode and a third of said electrodes to cause self-oscillations at said given periodicity in said circuit to sequentially initiate and cut off space current flow in said tube in response to the current flow from said anode; and coupling means connected between said deflection windings and the anode-to-cathode path of said tube for applying the current at said given periodicity from said anode to said windings.

3. In a television receiver having a cathode ray image reproducing device and electromagnetic deflection windings for said device, a deflection waveform generator for supplying current varying at a given periodicity to said deflection windings, comprising in combination:

an electron tube having an anode, a cathode and a pluality of electrodes intermediate between said cathode and anode;

an output circuit for said generator including coupling means connected between said anode and said deflection windings for applying said deflection current varying at said given periodicity to said windings;

feedback means including a charging capacitor connected between said anode and a first of said electrodes for maintaining self-oscillations at said given periodicity in said generator by sequentially charging said capacitor to cut off space current flow in said tube and discharging said capacitor to initiate space current flow in said tube;

circuit means connected to a second of said electrodes for deriving a signal varying at said given periodicity in response to current flow to said second of said electrodes; and means responsive to said signal to increase the space current flow to said second electrode and decrease the space current flow to said anode at said given periodicity.

4. In a television receiver having a cathode ray image reproducing device and electromagnetic deflection windings for said device, a deflection waveform generator for supplying current varying at a given periodicity to said deflection windings, comprising in combination:

an electron tube having an anode, a cathode and a plurality of electrodes intermediate between said cathode and anode;

circuit means connected between said anode and a first of said electrodes for maintaining self-oscillations in said generator to sequentially initiate and cut off space current flow in said tube at said given periodicity;

further circuit means connected to a second of said electrodes for deriving a signal varying at said given periodicity in response to current flow to said second of said electrodes;

means for applying said signal to a third of said electrodes to increase the space current flow to said second electrode and decrease space current flow to said anode at said given periodicity; and coupling means connected between said deflection windings and the anode-to-cathode path of said tube for applying deflection current varying at said given periodicity to said windings.

5. In a television receiver having a cathode ray image reproducing device and electromagnetic deflection windings for said device, and further having a source of control signals, a deflection waveform generator for supplying current varying at a given periodicity to said deflection windings comprising in combination:

an electron tube having an anode, a cathode and a plurality of electrodes intermediate between said cathode and anode;

coupling means connected in the anode-to-cathode path of said tube for applying the anode current of said tube to said deflection windings at said given periodicity;

feedback means connected between said anode and a first of said electrodes for maintaining self-oscillations in said circuit for sequentially initiating and cutting off space current flow in said tube at said given periodicity;

circuit means connected to a second of said electrodes for deriving a signal varying at said given periodicity in response to current flow to said second of said electrodes;

means responsive to said signal to increase the space current flow to said second electrode and decrease the space current flow to said anode at said given periodicity; and means for applying said control signals to said tube to synchronize the self-oscillations of said generator.

6. In a television receiver having a cathode ray image reproducing device and electromagnetic deflection windings for said device, and further having a source of control pulses, a deflection waveform generator for supplying current varying at a given periodicity to said deflection windings comprising in combination:

an electron tube having an anode, a cathode and a plurality of electrodes intermediate between said cathode and anode;

coupling means connected in the anode-to-cathode path of said tube for applying the anode current of said tube to said deflection windings at said given periodicity;

feedback means including a charging capacitor connected between said anode and a first of said electrodes for maintaining self-oscillations in said circuit for sequentially initiating and cutting off space current flow in said tube at said given periodicity;

circuit means connected to a second of said electrodes for deriving a signal varying at said given periodicity in response to current flow to said second of said electrodes;

means for applying said signal to a third of said electrodes to increase the space current flow to said second electrode and decrease the space current flow to said anode at said given periodicity; and means for applying said control pulses to said tube to synchronize the self-oscillations of said generator.

7. In a television receiver having a cathode ray image reproducing device and electromagnetic deflection windings for said device, a circuit for generating and supplying to said deflection windings a periodic sawtooth current wave having alternate gradual and steep slope portions, comprising in combination:

an electron tube having an anode, a cathode, and control, screen and suppressor grid electrodes intermediate between said cathode and anode;

an output circuit including a transformer coupled between said anode and said deflection windings and productive of pulses induced by the steep slope portions of said sawtooth current wave;

a capacitor connected to said control grid;

means coupling said capacitor to said anode to receive said pulses for effecting a charging current flow through said capacitor and the control grid-to-cathode path of said electron tube, resulting in the rapid charging of said capacitor and the development at said control grid of a voltage suitable to interrupt all electron current flow in said tube;

first circuit means connected to said control grid and to said capacitor for slowly discharging said capacitor, resulting in an alteration of the voltage at said control grid effective to reinstitute electron current flow in said tube to said anode and the initiation of the gradual slope portion of said sawtooth current wave;

second circuit means connected to said screen grid for developing a signal varying at the periodicity of said sawtooth current wave in response to electron current flow to said screen grid; and means for applying said signal to said suppressor grid to increase electron current flow to said screen grid and simultaneously to decrease electron current flow to said anode at the periodicity of said sawtooth current wave, resulting in an abrupt interruption of electron current flow to said anode and the initiation of the steep slope portion of said sawtooth current wave.

8. In a television receiver having a cathode ray image reproducing device and electromagnetic deflection windings for said device, a circuit for generating and supplying to said deflection windings a periodic sawtooth current wave having alternate gradual and steep slope portions, comprising in combination:

an electron tube having an anode, a cathode, and control, screen and suppressor grid electrodes intermediate between said cathode and anode;

an output circuit including a transformer coupled between said anode and said deflection windings and productive of pulses induced by the steep slope portions of said sawtooth current wave;

a capacitor connected to said control grid;

means coupling said capacitor to said anode to receive said pulses for effecting a charging current flow through said capacitor and the control grid-to-cathode path of said electron tube, resulting in the rapid charging of said capacitor and the development at said control grid of a voltage suitable to interrupt all electron current flow in said tube;

first circuit means including a first resistor connected to said control grid and to said capacitor for slowly discharging said capacitor, resulting in an alteration of the voltage at said control grid effective to reinstitute electron current flow in said tube to said anode and the initiation of the gradual slope portion of said sawtooth current wave;

second circuit means including a second resistor connected to said screen grid for developing a signal varying at the periodicity of said sawtooth current wave in response to electron current flow to said screen grid; and means including a coupling capacitor for applying said signal to said suppressor grid to increase electron current flow to said screen grid and simultaneously to decrease electron current flow to said anode at the periodicity of said sawtooth current wave, resulting in an abrupt interruption of electron current flow to said anode and the initiation of the steep slope portion of said sawtooth current wave.

9. In a television receiver having a cathode ray image reproducing device and electromagnetic deflection windings for said device, a circuit for generating and supplying to said deflection windings a periodic sawtooth current wave having alternate gradual and steep slope portions, comprising in combination:

an electron tube having an anode, a cathode, and control, screen and suppressor grid electrodes intermediate between said cathode and anode;

an output circuit including a transformer coupled between said anode and said deflection windings and productive of pulses induced by the steep slope portions of said sawtooth current wave;

a capacitor connected to said control grid;

means coupling said capacitor to said anode to receive said pulses for effecting a charging current flow through said capacitor and the control grid-to-cathode path of said electron tube, resulting in the rapid charging of said capacitor and the development at said control grid of a voltage suitable to interrupt all electron current flow in said tube;

first circuit means including a variable resistor connected to said control grid and to said capacitor for slowly discharging said capacitor, resulting in an alteration of the voltage at said control grid effective to reinstitute electron current flow in said tube to said anode and the initiation of the gradual slope portion of said sawtooth current wave, the adjustment of said variable resistor determining the periodicity of said sawtooth current wave;

second circuit means connected to said screen grid for developing a signal varying at the periodicity of said sawtooth current wave in response to electron current flow to said screen grid; and means for applying said signal to said suppressor grid to increase electron current flow to said screen grid and simultaneously to decrease electron current flow to said anode at the periodicity of said sawtooth current wave, resulting in an abrupt interruption of electron current flow to said anode and the initiation of the steep slope portion of said sawtooth current wave.

10. In a television receiver having a cathode ray image reproducing device and electromagnetic deflection windings for said device, a circuit for generating and supplying to said deflection windings a periodic sawtooth current wave having alternate gradual and steep slope portions, comprising in combination:

an electron tube having an anode, a cathode, and control, screen and suppressor grid electrodes intermediate between said cathode and anode;

an output circuit including a transformer coupled between said anode and said deflection windings and productive of pulses induced by the steep slope portions of said sawtooth current wave;

a capacitor connected to said control grid;

means including a potentiometer coupling said capacitor to said anode to receive said pulses for effecting a charging current flow through said capacitor and the control grid-to-cathode path of said electron tube, resulting in the rapid charging of said capacitor and the development at said control grid of a voltage suitable to interrupt all electron current flow in said tube, the adjustment of said potentiometer determining the linearity of said sawtooth current wave;

first circuit means including a variable resistor connected to said control grid and to said capacitor for slowly discharging said capacitor, resulting in an alteration of the voltage at said control grid effective to reinstitute electron current flow in said tube to said anode and the initiation of the gradual slope portion of said sawtooth current wave, the adjustment of said variable resistor determining the periodicity of said sawtooth current wave;

second circuit means connected to said screen grid for developing a signal varying at the periodicity of said sawtooth current wave in response to electron current flow to said screen grid; and means for applying said signal to said suppressor grid to increase electron current flow to said screen grid and simultaneously to decrease electron current flow to said anode at the periodicity of said sawtooth current wave, resulting in an abrupt interruption of electron current flow to said anode and the initiation of the steep slope portion of said sawtooth current wave.

11. In a television receiver having a cathode ray image reproducing device and electromagnetic deflection windings for said device, a circuit for generating and supplying to said deflection windings a periodic sawtooth current wave having alternate gradual and steep slope portions, comprising in combination:

an electron tube having an anode, a cathode, and control, screen and suppressor grid electrodes intermediate between said cathode and anode;

an output circuit including a transformer coupled between said anode and said deflection windings and productive of pulses induced by the steep slope portions of said sawtooth current wave;

a capacitor connected to said control grid;

means coupling said capacitor to said anode to receive said pulses for effecting a charging current flow through said capacitor and the control grid-to-cathode path of said electron tube, resulting in the rapid charging of said capacitor and the development at said control grid of a voltage suitable to interrupt all electron current flow in said tube;

means including a first variable resistor connected to said control grid-to-cathode path for controlling the amplitude of said sawtooth current wave;

first circuit means including a second variable resistor connected to said control grid and to said capacitor for slowly discharging said capacitor, resulting in an alteration of the voltage at said control grid effective to reinstitute electron current flow in said tube to said anode and the initiation of the gradual slope portion of said sawtooth current wave, the adjustment of said second variable resistor determining the periodicity of said sawtooth current wave;

second circuit means connected to said screen grid for developing a signal varying at the periodicity of said sawtooth current wave in response to electron current flow to said screen grid; and means for applying said signal to said suppressor grid to increase electron current flow to said screen grid and simultaneously to decrease electron current flow to said anode at the periodicity of said sawtooth current wave, resulting in an abrupt interruption of electron current flow to said anode and the initiation of the steep slope portion of said sawtooth current wave.

12. In a television receiver having a cathode ray image reproducing device and electromagnetic deflection windings for said device, a circuit for generating and supplying to said deflection windings a periodic sawtooth current wave having alternate gradual and steep slope portions, comprising in combination:

an electron tube having an anode, a cathode, and control, screen and suppressor grid electrodes intermediate between said cathode and anode;

an output circuit including a transformer coupled between said anode and said deflection windings and productive of pulses induced by the steep slope portions of said sawtooth current wave;

a capacitor connected to said control grid;

means including a potentiometer coupling said capacitor to said anode to receive said pulses for effecting a charging current flow through said capacitor and the control grid-to-cathode path of said electron tube, resulting in the rapid charging of said capacitor and the development at said control grid of a voltage suitable to interrupt all electron current flow in said tube, the adjustment of said potentiometer determining the linearity of said sawtooth current wave;

means including a first variable resistor connected to said control grid-to-cathode path for controlling the amplitude of said sawtooth current wave;

first circuit means connected to said control grid and to said capacitor for slowly discharging said capacitor, resulting in an alteration of the voltage at said control grid effective to reinstitute electron current flow in said tube to said anode and the initiation of the gradual slope portion of said sawtooth current wave;

second circuit means connected to said screen grid for developing a signal varying at the periodicity of said sawtooth current wave in response to electron current flow to said screen grid; and means for applying said signal to said suppressor grid to increase electron current flow to said screen grid and simultaneously to decrease electron current flow to said anode at the periodicity of said sawtooth current wave, resulting in an abrupt interruption of electron current flow to said anode and the initiation of the steep slope portion of said sawtooth current wave.

13. In a television receiver having a cathode ray image reproducing device and electromagnetic deflection windings for said device, a circuit for generating and supplying to said deflection windings a periodic sawtooth current wave having alternate gradual and steep slope portions, comprising in combination:

an electron tube having an anode, a cathode, and control, screen and suppressor grid electrodes intermediate between said cathode and anode;

an output circuit including a transformer coupled between said anode and said deflection windings and productive of pulses induced by the steep slope portions of said sawtooth current wave;

a capacitor connected to said control grid;

means including a potentiometer coupling said capacitor to said anode to receive said pulses for effecting a charging current flow through said capacitor and the control grid-to-cathode path of said electron tube, resulting in the rapid charging of said capacitor and the development at said control grid of a voltage suitable to interrupt all electron current flow in said tube, the adjustment of said potentiometer determining the linearity of said sawtooth current wave;

means including a first variable resistor connected to said control grid-to-cathode path for controlling the amplitude of said sawtooth current wave;

first circuit means including a second variable resistor connected to said control grid and to said capacitor for slowly discharging said capacitor, resulting in an alteration of the voltage at said control grid effective to reinstitute electron current flow in said tube to said anode and the initiation of the gradual slope portion of said sawtooth current wave, the adjustment of said second variable resistor determining the periodicity of said sawtooth current wave;

second circuit means connected to said screen grid for developing a signal varying at the periodicity of said sawtooth current wave in response to electron current flow to said screen grid; and means for applying said signal to said suppressor grid to increase electron current flow to said screen grid and simultaneously to decrease electron current flow to said anode at the periodicity of said sawtooth current wave, resulting in an abrupt interruption of electron current flow to said anode and the initiation of the steep slope portion of said sawtooth current wave.

References Cited by the Examiner

UNITED STATES PATENTS

| | | | |
|---|---|---|---|
| 2,755,385 | 7/56 | Parsons | 331—152 |
| 3,015,078 | 12/61 | Cones | 331—152 |

DAVID G. REDINBAUGH, *Primary Examiner.*

ROBERT SEGAL, *Examiner.*

UNITED STATES PATENT OFFICE

CERTIFICATE OF CORRECTION

Patent No. 3,187,219 June 1, 1965

Wayne M. Austin et al.

It is hereby certified that error appears in the above numbered patent requiring correction and that the said Letters Patent should read as corrected below.

Column 4, lines 59 and 60, strike out "supplying current varying at a given periodicity to" and insert the same after "for" in line 61, same column 4.

Signed and sealed this 2nd day of November 1965.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,187,219 June 1, 1965

Wayne M. Austin et al.

It is hereby certified that error appears in the above numbered patent requiring correction and that the said Letters Patent should read as corrected below.

Column 4, lines 59 and 60, strike out "supplying current varying at a given periodicity to" and insert the same after "for" in line 61, same column 4.

Signed and sealed this 2nd day of November 1965.

(SEAL)
Attest:

ERNEST W. SWIDER
Attesting Officer

EDWARD J. BRENNER
Commissioner of Patents